US010454599B2

(12) United States Patent
Hadley et al.

(10) Patent No.: US 10,454,599 B2
(45) Date of Patent: Oct. 22, 2019

(54) SYSTEM FOR VISUALIZATION OF ELECTROMAGNETIC WAVE DISTRIBUTION AND COLLABORATIVE WEB-BASED DESIGN FOR OPTIMAL DISTRIBUTION OF EMITTERS

(71) Applicant: Bit Lion, LLC, The Colony, TX (US)

(72) Inventors: Ryan Robert Hadley, The Colony, TX (US); Mark Marian Vasile, The Colony, TX (US)

(73) Assignee: Bit Lion, LLC, The Colony, TX (US)

( * ) Notice: Subject to any disclaimer, the term of this patent is extended or adjusted under 35 U.S.C. 154(b) by 167 days.

(21) Appl. No.: 15/480,278

(22) Filed: Apr. 5, 2017

(65) Prior Publication Data

US 2017/0288980 A1 Oct. 5, 2017

Related U.S. Application Data

(60) Provisional application No. 62/318,280, filed on Apr. 5, 2016.

(51) Int. Cl.
| | |
|---|---|
| *H04B 17/27* | (2015.01) |
| *H04B 17/318* | (2015.01) |
| *H04L 12/18* | (2006.01) |
| *H04L 12/24* | (2006.01) |
| *H04W 84/12* | (2009.01) |

(52) U.S. Cl.
CPC ........... *H04B 17/318* (2015.01); *H04B 17/27* (2015.01); *H04L 12/1813* (2013.01); *H04L 41/0273* (2013.01); *H04L 12/1818* (2013.01); *H04W 84/12* (2013.01)

(58) Field of Classification Search
CPC ......... H04L 12/00; H04L 12/02; H04L 12/12; H04L 12/16; H04L 12/18; H04L 12/1813; H04L 41/00; H04L 41/02; H04L 41/0246; H04L 41/026–0273; H04L 43/00; H04L 43/50; H04L 67/00; H04L 67/32; H04L 67/36; H04B 1/00; H04B 1/0003; H04B 10/00; H04B 17/00; H04B 17/10; H04B 17/15; H04B 17/20; H04B 17/27; H04B 17/29; H04B 17/30–318; H04B 17/391; H04B 17/3912; H04B 17/3913
See application file for complete search history.

(56) References Cited

U.S. PATENT DOCUMENTS

| 5,394,522 | A | * | 2/1995 | Sanchez-Frank | ....... H04L 29/00 715/735 |
|---|---|---|---|---|---|
| 5,450,615 | A | * | 9/1995 | Fortune | .................. G01R 29/08 455/504 |

(Continued)

OTHER PUBLICATIONS

Nevyn—Wi-Fi signal radius generator calculator—WiGLE.net—2008.*

*Primary Examiner* — Michael A Keller
*Assistant Examiner* — Boris D Grijalva Lobos
(74) *Attorney, Agent, or Firm* — Alliance IP, LLC (57) ABSTRACT

Aspects of the embodiments are directed to a collaborative tool that can include receiving one or more design parameters into a web server for designing a placement of one or more electromagnetic emitters; designing a structural layout for configuring a wireless network; virtually placing a plurality of electromagnetic emitters in different areas around the structural layout; testing electromagnetic signal strength in the structural layout; and optimizing the electromagnetic emitter placement.

14 Claims, 8 Drawing Sheets

(56) References Cited

U.S. PATENT DOCUMENTS

| | | | | | |
|---|---|---|---|---|---|
| 5,561,841 | A * | 10/1996 | Markus | H04W 16/18 | 455/446 |
| 5,821,937 | A * | 10/1998 | Tonelli | H04L 41/12 | 715/853 |
| 5,831,874 | A * | 11/1998 | Boone | H04B 17/391 | 703/2 |
| 5,953,669 | A * | 9/1999 | Stratis | H04W 16/18 | 455/449 |
| 6,021,316 | A * | 2/2000 | Heiska | H04W 16/18 | 455/446 |
| 6,499,006 | B1 * | 12/2002 | Rappaport | H04W 16/20 | 703/20 |
| 6,721,769 | B1 * | 4/2004 | Rappaport | G06F 16/50 | 707/737 |
| 6,748,420 | B1 * | 6/2004 | Quatrano | G06F 16/954 | 709/205 |
| 7,019,753 | B2 * | 3/2006 | Rappaport | H04L 41/12 | 345/582 |
| 7,055,107 | B1 * | 5/2006 | Rappaport | H04L 41/145 | 703/1 |
| 7,085,697 | B1 * | 8/2006 | Rappaport | H04L 41/145 | 455/422.1 |
| 7,096,173 | B1 * | 8/2006 | Rappaport | H04W 16/18 | 455/422.1 |
| 7,149,776 | B1 * | 12/2006 | Roy | G06F 16/954 | 709/205 |
| 7,370,269 | B1 * | 5/2008 | Prabhu | G06F 16/954 | 715/230 |
| 7,516,435 | B2 * | 4/2009 | Petunin | G06F 17/5068 | 709/203 |
| 7,546,571 | B2 * | 6/2009 | Mankin | G06F 17/5045 | 700/103 |
| 7,590,963 | B2 * | 9/2009 | Petunin | G06F 17/5068 | 716/137 |
| 7,596,518 | B2 * | 9/2009 | Rappaport | G06Q 30/04 | 455/403 |
| 7,707,249 | B2 * | 4/2010 | Spataro | H04L 65/403 | 709/205 |
| 7,711,371 | B2 * | 5/2010 | Basak | H04W 16/18 | 455/446 |
| 7,933,952 | B2 * | 4/2011 | Parker | H04L 12/1813 | 709/204 |
| 7,949,990 | B2 * | 5/2011 | Pfeil | G06F 17/50 | 715/733 |
| 8,077,090 | B1 * | 12/2011 | Chintalapudi | G01S 11/06 | 342/450 |
| 8,983,477 | B2 * | 3/2015 | Wirola | G01S 5/0252 | 370/254 |
| 9,158,746 | B2 * | 10/2015 | Bartek | G06F 17/24 | |
| 2002/0129106 | A1 * | 9/2002 | Gutfreund | G06Q 10/10 | 709/205 |
| 2003/0103089 | A1 * | 6/2003 | Ramani | G06F 17/50 | 715/848 |
| 2003/0229478 | A1 * | 12/2003 | Rappaport | H04W 16/20 | 703/13 |
| 2004/0107249 | A1 * | 6/2004 | Moser | G06Q 10/107 | 709/204 |
| 2005/0043933 | A1 * | 2/2005 | Rappaport | H04L 41/22 | 703/1 |
| 2005/0160396 | A1 * | 7/2005 | Chadzynski | G06F 9/541 | 717/103 |
| 2006/0019679 | A1 * | 1/2006 | Rappaport | G01S 5/0252 | 455/456.5 |
| 2006/0116853 | A1 * | 6/2006 | Rappaport | G01F 23/0061 | 702/182 |
| 2007/0258421 | A1 * | 11/2007 | Alizadeh-Shabdiz | G01S 5/0252 | 370/338 |
| 2008/0028323 | A1 * | 1/2008 | Rosen | G06Q 10/10 | 715/752 |
| 2008/0085692 | A1 * | 4/2008 | Hart | H04W 16/20 | 455/187.1 |
| 2008/0182528 | A1 * | 7/2008 | Le | H04B 1/10 | 455/91 |
| 2008/0244418 | A1 * | 10/2008 | Manolescu | G06Q 10/00 | 715/753 |
| 2008/0276184 | A1 * | 11/2008 | Buffet | G06Q 10/10 | 715/752 |
| 2012/0317108 | A1 * | 12/2012 | Okazaki | G06F 3/0488 | 707/732 |
| 2015/0373068 | A1 * | 12/2015 | Allen | G06F 16/273 | 709/204 |
| 2016/0234258 | A1 * | 8/2016 | Darbha | H04L 67/141 | |
| 2016/0366145 | A1 * | 12/2016 | Raghavendra | H04L 63/102 | |
| 2018/0107455 | A1 * | 4/2018 | Psistakis | G06F 8/20 | |

\* cited by examiner

SYSTEM FOR VISUALIZATION OF ELECTROMAGNETIC WAVE DISTRIBUTION AND COLLABORATIVE WEB-BASED DESIGN FOR OPTIMAL DISTRIBUTION OF EMITTERS

CROSS REFERENCE TO RELATED APPLICATION

This disclosure is a non-provisional patent application that claims the benefit of U.S. Provisional Patent Application Ser. No. 62/318,280, filed on Apr. 5, 2016, the entire contents of which are incorporated by reference herein.

TECHNICAL FIELD

This disclosure pertains to, but is not limited to, the field of wireless networking, and more specifically, the disclosure pertains to, but is not limited to, a web-based, collaborative application that allows one or more users to design wireless networks for small, medium, and large sized companies, interactively and predictively.

BACKGROUND

Wireless networks, such as a Wi-Fi network, can be deployed in office buildings, libraries, and other structures that may have complex or uneven layouts. Building layout complexity can result in uneven wireless radio signal strength distribution.

SUMMARY

This disclosure describes predicting Wi-Fi distribution of signals that include applying the Wi-Fi vendor's best practice policies to the design. The systems and methods described herein seek to solve this issue by emphasizing the best practices from the vendor and uses sophisticated algorithms that automatically place emitters in their best possible locations based on client parameters. This disclosure also describes a web based collaborative environment that enables multiple users to design, review, and plan for Wi-Fi network deployments.

Aspects of the embodiments are directed to a computer program product tangibly embodied on non-transient storage media, the computer program product comprising computer code that comprises instructions that are operable when executed to cause a hardware processor to receive one or more design parameters into a web server for designing a placement of one or more electromagnetic emitters; design a structural layout for configuring a wireless network; virtually place a plurality of electromagnetic emitters in different areas around the structural layout; test electromagnetic signal strength in the structural layout; and optimize the electromagnetic emitter placement.

Aspects of the embodiments are directed to a computer implemented method that includes receiving one or more design parameters into a web server for designing a placement of one or more electromagnetic emitters; designing a structural layout for configuring a wireless network; virtually placing a plurality of electromagnetic emitters in different areas around the structural layout; testing electromagnetic signal strength in the structural layout; and optimizing the electromagnetic emitter placement.

Aspects of the embodiments are directed to a system for providing a Wi-Fi design tool, the system including a server that includes a hardware processor and a memory. The server can store Wi-Fi design tools and elements, such as building and/or structural design elements for simulating a building design, Wi-Fi emitter elements that can simulate a Wi-Fi signal, interface software for providing a web-based interface for accessing the Wi-Fi design tool, and algorithms for placing emitters, simulating building properties, and analyzing simulated Wi-Fi coverage. The server can be accessed by a device across a network connection. The device can log into the server using a profile that can be tied to one or more stored files, customized tools, and other personalized or customized resources stored on the server. The device can be provided an interface across the network and displayed on the device. The interface can allow a user to access the building tools to simulate the construction of a building or office. The interface can also allow the user to access the Wi-Fi emitter simulation tools to place emitters, and analyze a simulated Wi-Fi signal. The server can also provide a genetic algorithm to iteratively change emitter number and placement, based on whether the emitter placement and/or number satisfy a plan quality threshold, the threshold considering one or more factors, such as coverage and cost.

DETAILED DESCRIPTION

This disclosure pertains to, but is not limited to, the field of wireless networking, and more specifically, the disclosure pertains to, but is not limited to, a web-based, collaborative application that allows one or more users to design wireless networks for small, medium, and large sized companies, interactively and predictively.

Figure 1:
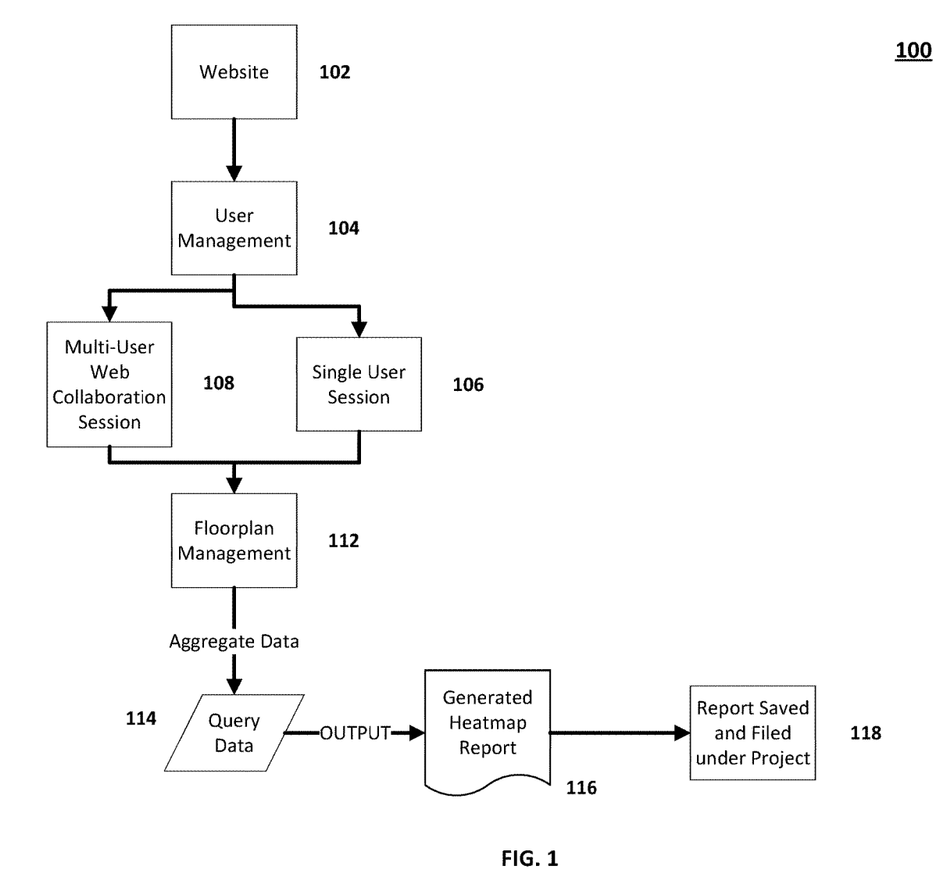
FIG. 1 is a diagram that illustrates a system level view and user experience in accordance with embodiments of the present disclosure.

FIG. 1 is a diagram that illustrates a system level view and user experience in accordance with embodiments of the present disclosure. A user can interface with a website 102 using a computer, tablet, smartphone, or other computing device. The user can visit a website hosted by a provider of the design software. Through a user management interface 104, the user then either registers on the website as an individual, part of a corporate group, or simply logs in after registering an account.

In embodiments, the user can use the software as part of a single user session 106 or a multi-user web collaboration session 108. The Multi-User Web Collaboration Session 108, also referred to as a "Pond Session", is a web-based collaborative workspace that allows one or more users to work on and design Wi-Fi deployment plan using one or more floorplans.

A user that does not wish to work on a collaborative design can instead work on one using the workspace provided, individually. If they so choose, however, can convert the single-user session to a Multi-User session at will.

Floorplan Management 112 allows the user to manage their projects, locations, buildings, and floors for each of their Wi-Fi designs. This section allows the user to create, edit, and delete any of their project related items. The aggregated data, which comes from the resulting design, can be queried for reporting by a query module 114 depending on specific filters that the user desires, resulting in personalized reporting.

Signal Coverage Maps (heat maps) generated 116 and individualized reporting can be generated and sent to specific recipients, and stored on a server. Reports are saved and filed (118) according to the project that they are related to.

Figure 2:
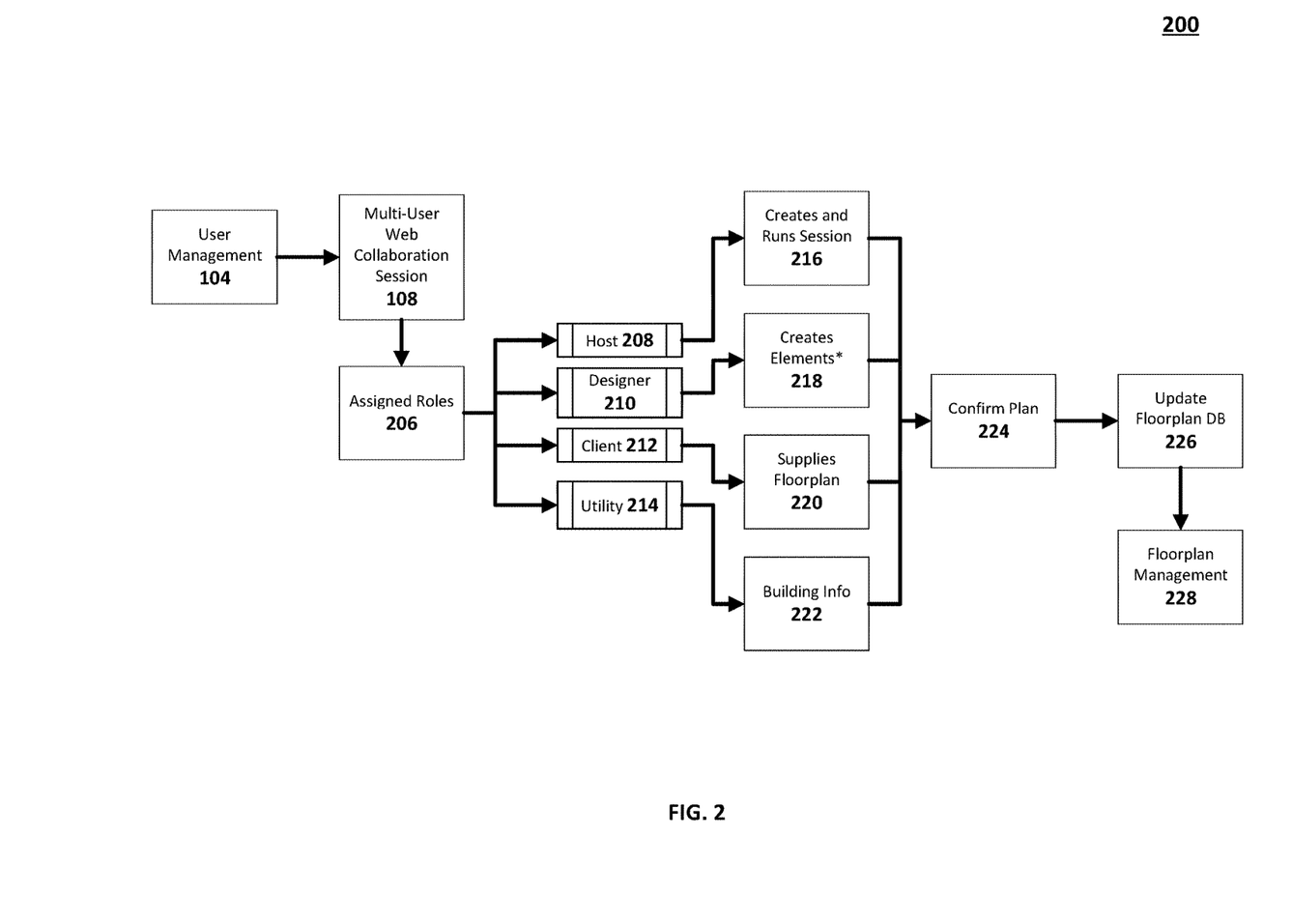
FIG. 2 is a diagram that shows the collaboration process that takes place when multiple users are working on the same floorplan and the respective roles they may have.

FIG. 2 is a workflow diagram for a multi-user web collaboration session for a wireless network design in accordance with embodiments of the present disclosure. A user logs into the website and is able to select their project through user management interface 104. A user selects their project and then initiates a Multi-User Web Collaboration Session 108, which sends invitations out to individuals related to the project. Assigned Roles 206 are decided by the user through the interface: among the roles include a host 208, a designer 210, a client 212, and utility 214.

The Host 208 has control over the entire collaboration session, including but not limited to, the roles assigned to other users that enter the collaboration session, and the workspace at any given time. The Host 208 also controls when the collaboration session has concluded. The Host 208 is also able to prioritize reporting to involved parties.

The Designer 210 requests a floorplan from either the client or from the project repository.

The Client 212 uploads a floorplan 220 from their own computer to the shared workspace during a collaboration session.

The Utility 214 locates Main Distribution Frames (MDFs) and Intermediate Distribution Frame (IDFs) in the building, and designs wire runs, which are automatically calculated, and how wires will be run to emitters.

The Host 208 creates and runs the entire session 216. They have full control over every aspect of the project during the design process.

The Designer 210 creates elements 218, such as drawing the perimeter, walls, attenuation zones, occupant zones which are areas of high client transmit and receive density, and selects the ceiling types. Designer 210 can also load a floorplan from the project repository.

The Client 212 can provide the floorplan to the workspace, along with location data that corresponds to the floorplan. They can also provide site contact(s) for the Utility.

The Utility 214 can provide insight into the MDF/IDF locations, points of ingress and egress, and estimate cable distances, and other building information 222.

The user (by default) can be the host 208 or the designer 210 (or both).

Once the design is finished, each party can confirm the plan (224). This will be used for reporting that each party can utilize that's specific to their defined role. The floorplan is then updated (226) and sent to the project repository database (DB). The completed and approved project can then be accessed via Floorplan Management (228).

Figure 3:
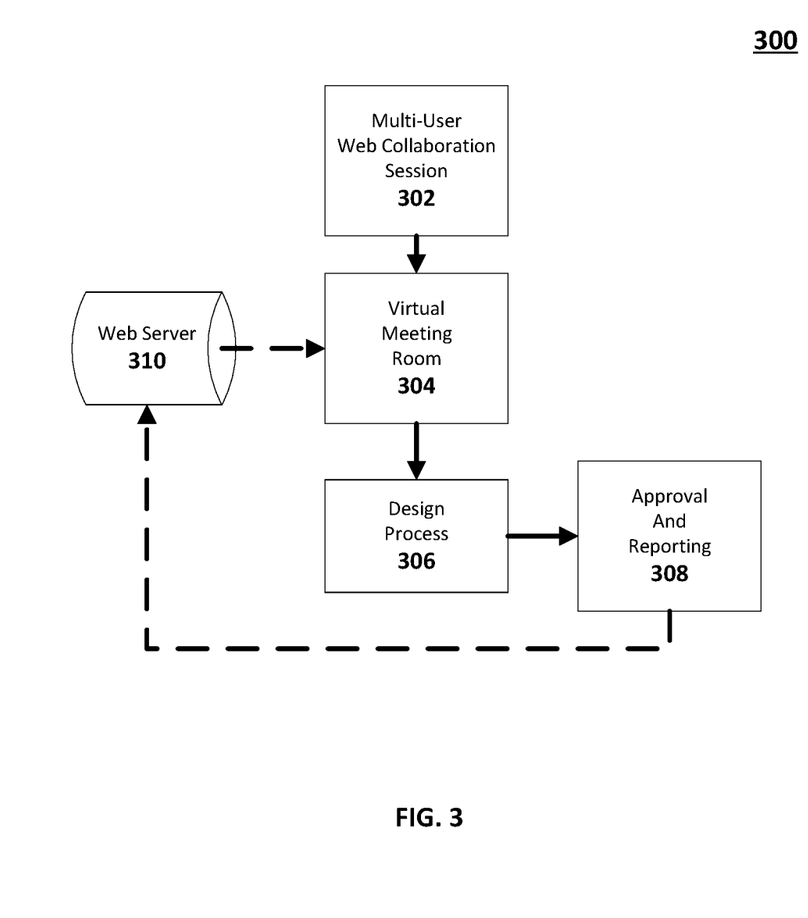
FIG. 3 is a diagram that shows the overall algorithmic process that takes place during a collaboration process.

FIG. 3 is a diagram that shows the overall algorithmic process that takes place during a collaboration process in accordance with embodiments of the present disclosure. The user can enter a Multiple Users Web Collaboration Session (302) with their respective roles. The interface can provide the attendees of the collaboration with a Virtual Meeting Room 304, which is created by the software and the Workspace is generated. The Design Process 306 of the floorplan takes place. Approval for the design (308) is obtained and reports are then generated and sent to their respective recipients. All information from the session is then processed and saved on the Web Server (310).

Figure 4:
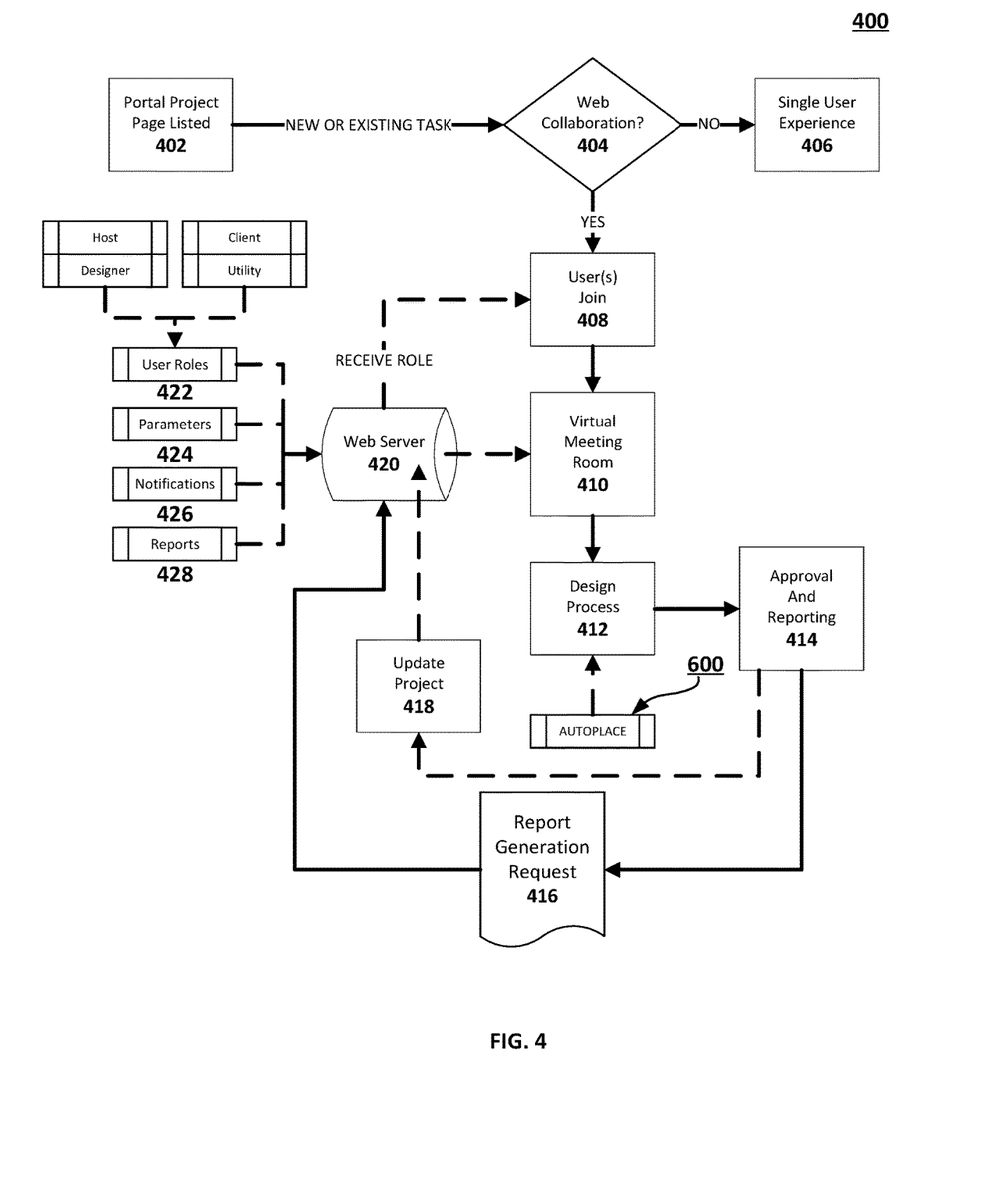
FIG. 4 is a diagram that shows the collaboration process from a detailed algorithmic perspective.

FIG. 4 is a diagram that shows the collaboration process from a detailed algorithmic perspective. A User accesses the Portal Project Page 402, which lists all of the projects, and selects the appropriate project. The User selects a new or existing task and then has the choice to either work on it with multiple people in a Web Collaboration Workspace or individually 404. The User can decide to work on the task alone 406. In embodiments, the user decides to work with multiple people in a Web Collaboration Workspace and has other users join 408. All of the Users join the Virtual Meeting Room 410 (Web Based Collaboration Workspace). The Design process takes place among all of the Users 412.

The Autoplace function 600 is then used to best-place Access Points (APs) and Air Monitors (AMs) according to the design parameters 424 and requirements of the user. The user has a choice to use the Autoplace function 600, but an optimal design can be difficult to achieve manually. The autoplace function 600 is described further in FIG. 6.

Approval for the design is obtained 414 and reports are then generated 416 and sent to the Web Server 420 for respective recipients with information pertinent to them. The report requests are sent to the Web Server 420 for processing.

In embodiments, an updated project can be sent to the Web Server 420. The Web Server 420 accepts the update and saves it to the Project repository.

One function of the Web Server 420 is to provide Reports 428 to Users. One function of the Web Server 420 is to provide notifications 426 to Users (at the discretion of the User) pertaining to changes a project, location, building, or floorplan via SMTP, POP, IMAP, or other communication protocols. One function of the Web Server 420 is to collect parameters 424 from the User that the Web Server 420 will use for various functions. One function of the Web Server 420 to assign user roles 422 based on the Host's request for assignment. This will be done via email addresses or other User Accounts already registered in the system.

The User given the Host role has the responsibility of creating and running the entire session, and inviting other users to participate in the Web Collaboration Workspace session, and will be able to control all aspects of the design process.

The User given the Designer role has the responsibility of drawing the perimeter of the building, the area where the emitters will transmit, walls and their types, attenuation zones, Occupant zones, and ceiling types.

The User given the Client role has the option of providing the floorplan, and will serve as the ultimate authority for the approval of the overall design.

The User given the Utility role has the responsibility of providing insight regarding the location of the MDF/IDF locations, points of ingress/egress, and cable run length estimates.

Figure 5:
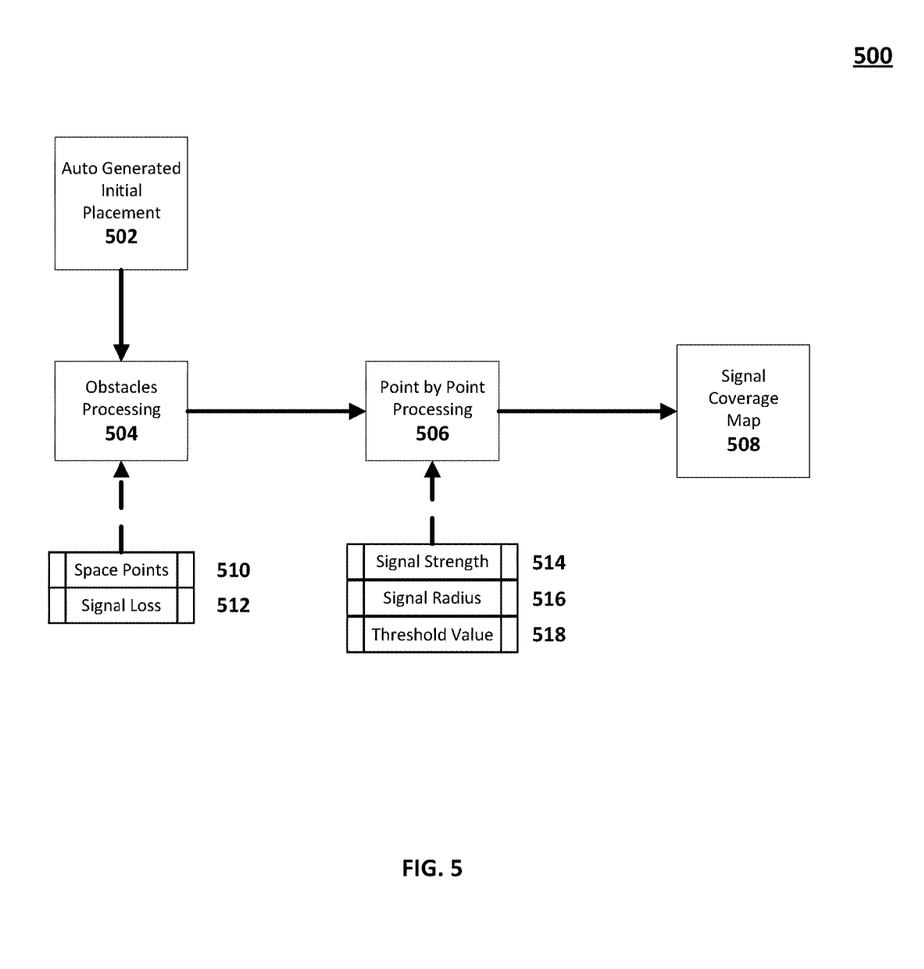
FIG. 5 is a diagram that shows the signal coverage process from a detailed algorithmic perspective.

FIG. 5 is a diagram illustrating a workflow for the signal coverage algorithm 500 in accordance with embodiments of the present disclosure. The Signal Coverage Algorithm 500 ("SCA") will take the requirements and the parameters from the user and make an initial coverage map using the specified emitter. At the outset, the autogenerated initial AP placement can be executed to virtually place APs in a design (502). The SCA will then perform an Obstacles Processing check (504. The entire floorplan is digitally sequenced into "Space Points" (SPs) 510, which are points on the floorplan that will contain projected attenuation values pertaining to the transmission medium of the emitter. Signal Loss 512 is the client's requirement for maximum acceptable signal loss across the floorplan.

The Point by Point Processing ("PPP") 506 check processes data from Obstacles Processing and applies additional parameters of the emitters at each Space Point. The PPP 506 check calculates signal strength 514 at each SP based on the signal strength of the chosen emitter. The PPP check 506 calculates the signal radius 516 at a given power level of the emitter. The PPP check 506 validates the signal threshold value 518 of the emitter from the signal coverage requirement from the client.

The Signal Coverage Map 508 is created and then sent to the Workspace as an overlay for review.

Figure 6:
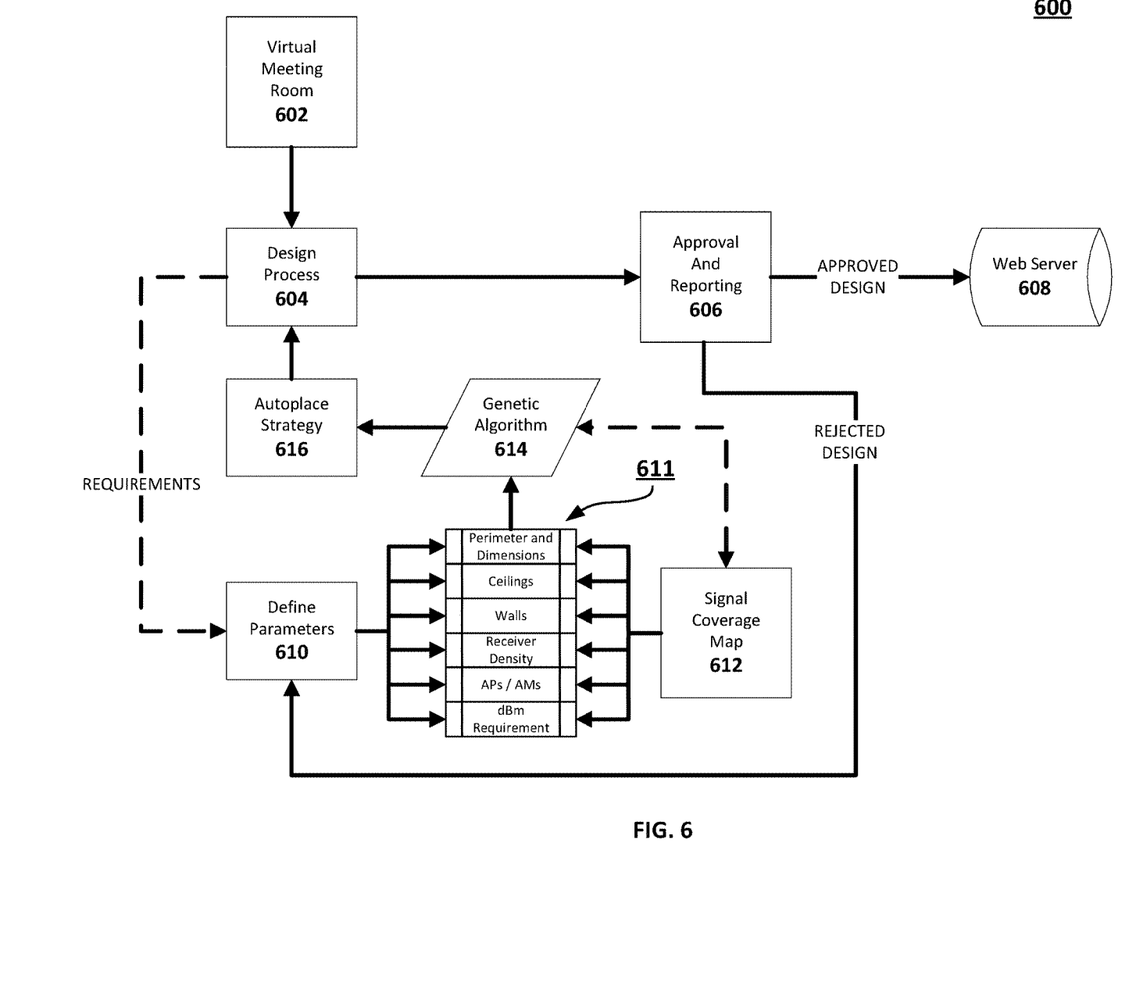
FIG. 6 is a diagram that shows the Autoplace Strategy from a detailed algorithmic perspective.

FIG. 6 is a diagram that shows the Autoplace Strategy 600 from a detailed algorithmic perspective in accordance with embodiments of the present disclosure. At the outset, the Users join the Virtual Meeting Room (Web Based Collaboration Workspace) (602). The Design process 604 takes place between all of the Users. The design process is similar to that described in FIGS. 2-5 above.

The parameters 611 of the design are defined and input by the User with the Design role for the project currently in work (610). For example, walls are drawn by the User and defined by the User, and include the type and attenuation value. Ceiling type and height are defined by the User. The perimeter and dimensions of the floorplan are defined by the User. Receiver Population is a parameter that is defined by the User that exists on the floor ("Occupant zones"). Examples of these zones could be conference rooms, training rooms, break rooms, meeting rooms, and presentation rooms, as well as cubicle areas. APs and AMs are parameters that are input by the User and can be any type of WiFi emitter from any vendor. Examples are: Access Points (APs) and Air Monitors (AMs), but could be any type of chosen emitter. Decibel-milliwatts (dBm) requirement is a parameter that is defined by the User that specifies (per the Client's request) the minimum required signal strength from placed emitters over the entire floorplan. For example, it could be the signal strength in dBm that the client has specified as a minimum signal strength coverage threshold (also known as a "heat map").

The Signal Coverage Map is then sent to the Workspace as an overlay for review (612). The signal coverage map can be defined as described in FIG. 5.

Figure 7:
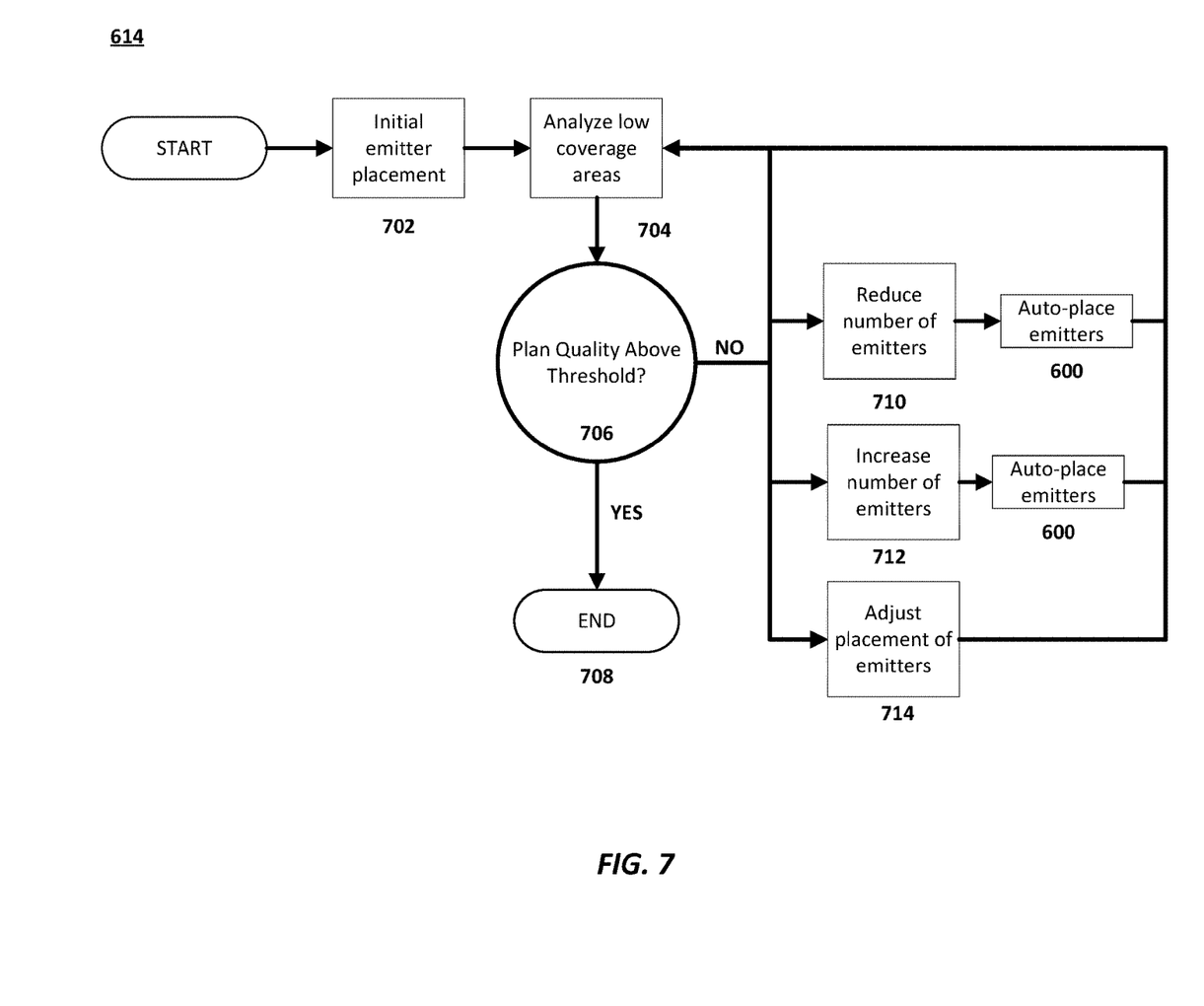
FIG. 7 is a process flow diagram of a Genetic Algorithm in accordance with embodiments of the present disclosure.

Turning briefly to FIG. 7, FIG. 7 is a process flow diagram 614 of a Genetic Algorithm in accordance with embodiments of the present disclosure. A Genetic Algorithm (GA) (a method for solving both constrained and unconstrained optimization problems based on a natural selection process that mimics biological evolution, that repeatedly modifies a population of individual solutions) is then used to continuously evolve optimal placement of emitters. At the outset of the GA process, the emitters are initially placed according to several rules (702). Among the rules for placing the emitters are a) the need for RSSI triangulation, which requires emitters to be placed starting at the exterior walls; b) the approximate signal radius of an emitter, usually set by the user; c) the approximate number of devices expected in an area, for each user-defined occupant zone; and d) major obstacles defined by the user, such as elevator shafts, stairwells, etc. The set of emitters can be specified by the user, or the algorithm can estimate the number of emitters necessary based on the surface area to be covered by signal. The emitter placement (and number) can be tested and analyzed (704). From this initial configuration and analysis, it can be determined whether the initial emitter placement and/or number satisfies a plan quality threshold (706). The plan quality threshold can take into consideration one or more plan quality factors. For example, a plan quality factor can include, but is not limited to, signal coverage area, signal quality per emitter, a number of emitters, over-all costs, etc. If the plan quality threshold is satisfied, then the GA process 614 can end. The analysis of the emitter placement and subsequent plan quality assessment can include: a) calculating the signal coverage; b) analyzing the low coverage areas to produce a convergence matrix; and c) if there are no low coverage areas, end the process (708).

If the plan quality threshold is not satisfied (for one or more of the expected plan quality factors), the GA process 614 can iteratively repeat a series of steps until the plan quality threshold is satisfied, or the configured set amount of time expires. For example, the series of steps can include creating two or more variants of the existing placement, in parallel. In a first variant, the number of emitters can be reduced (e.g., iteratively reduced or reduced by some number of emitters depending on the plan quality assessment results) (710); in a second variant, the number of emitters can be increased (e.g., iteratively increased or increased by some number of emitters depending on the plan quality assessment results) (712); and in a third variant, the emitter placement can be modified to better cover the areas of low signal (714). The emitter placement, as well as the re-numbering of the emitters, can each use the auto-place function 600 described in FIG. 6. The GA process 614 can then repeat the analysis of the low coverage areas (704) and the determination of whether the emitter placement and number satisfies the plan quality threshold(s) (706). The GA process can be implemented through any number of techniques, i.e. using artificial intelligence, or parallelized iterative optimization, etc.

Once the GA process reaches a best-place threshold signal coverage for one or more placement variants, the successful variants are sent to Autoplace Strategy (616). Autoplace Strategy selects the best plan based on the user selected strategy, which can be for example "cheapest deployment," "best coverage for maximum occupancy," etc.

Approval for the design is obtained and reports are generated and sent to the Web Server for respective recipients with information pertinent to them (606). The Web Server accepts the update and saves it to the Project repository (608).

Figure 8:
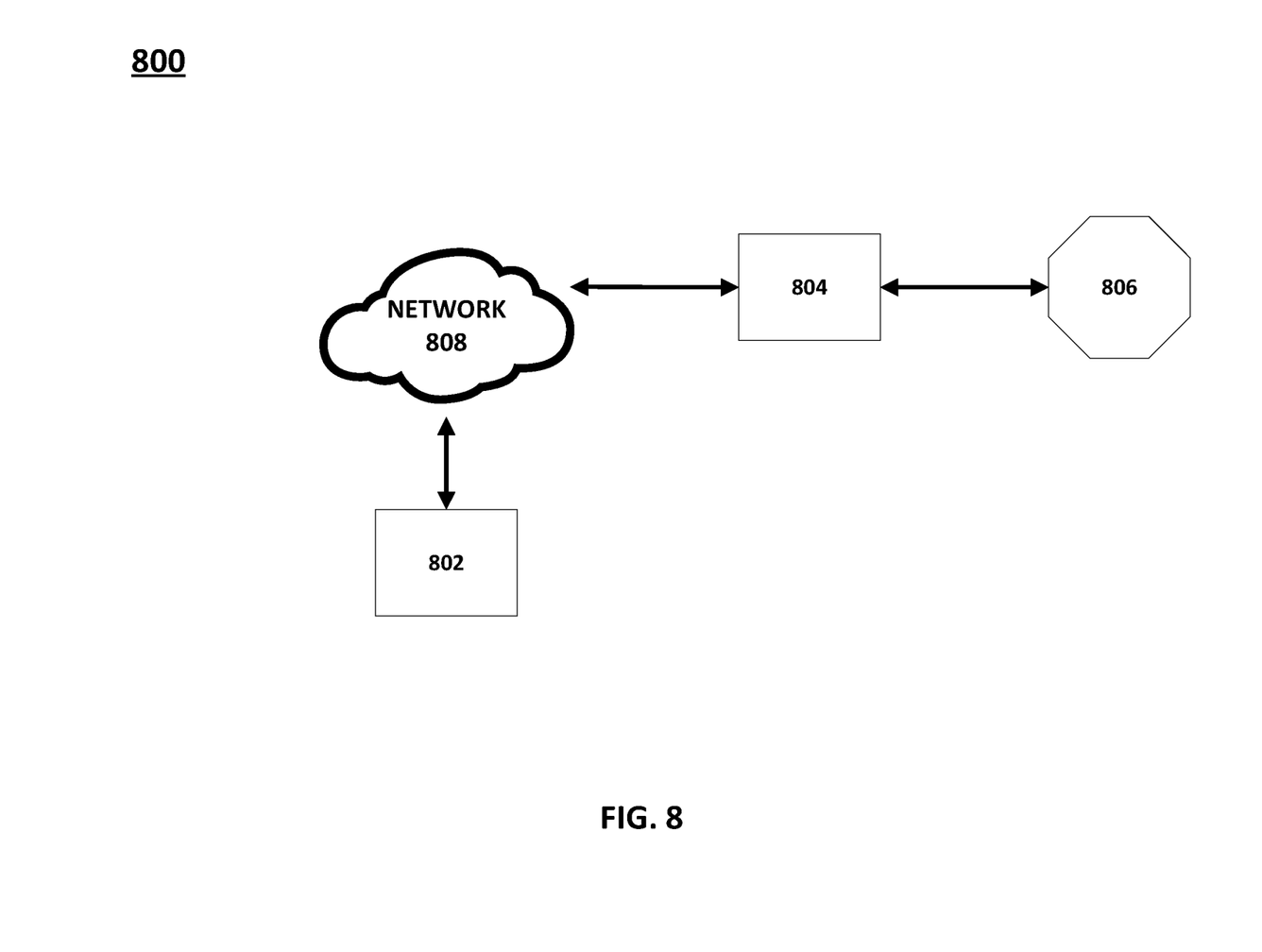
FIG. 8 is a schematic diagram of a computing system for a network visualization collaboration tool in accordance with embodiments of the present disclosure.

FIG. 8 is a schematic diagram of a computing system 800 for a network visualization collaboration tool in accordance with embodiments of the present disclosure. Computing system 800 can include a computing device 802. Computing device 802 can be a computer, laptop, tablet device, smartphone, or other computing device that can connect to network 808. The computing device 802 can include a hardware processor and a memory for storing instructions. The computing device 802 can store applications that provide an interface to the collaboration tool 806. The computing device 802 can execute program code to create virtual structures, run simulations and other algorithms to simulate WiFi design, as disclosed above, and access remote applications and storage devices from across a network connection. The computing device 802 can also store profile information, custom work spaces, structure drawings tools, data analysis results, and computer code that include algorithms. Though shown as a single computing device, it is understood that the system 800 can include more than one computing device that can connect to the network 808.

The computing system 800 also includes a server 804. Server 804 can includes a hardware processor and a memory. The server 804 can provide remote access to collaboration tool 806 by one or more computing devices 802 across a network 808. The server 804 can also store various tools that are accessible by the one or more computing devices 802 to perform a single user or collaborative WiFi design simulations. The server 804 can provide a platform for supporting the collaborative work space, for providing a remote application to each user, and to store virtual structures and WiFi simulation analytics.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A computer program product tangibly embodied on non-transient storage media, the computer program product comprising computer code that comprises instructions that are operable when executed to cause a hardware processor to:
  begin a collaborative web-based session for designing the structural layout;

transmit invitations to a plurality of users of the collaborative web-based session;
provide a web-based interface for each user of the collaborative web-based session;
receive one or more design parameters from a first of the plurality of users into a web server for designing a placement of one or more electromagnetic emitters;
receive an input for a design of a structural layout into the web server for configuring a wireless network;
receive an input from a second of the plurality of users of the web-based session to virtually place a plurality of electromagnetic emitters in different areas around the structural layout;
test electromagnetic signal strength in the structural layout using a virtualized simulation of electromagnetic emissions from each of the electromagnetic emitters; and
change the electromagnetic emitter placement based on the test of the electromagnetic signal;
wherein:
the instructions are operable to test placement of electromagnetic emitters by identifying one or more space points in the structural layout and identifying signal loss; and determine at each space point a signal strength, a signal radius, and a threshold value for signal strength defined by client requirements; and
wherein:
the change of the electromagnetic emitter placement comprises iteratively changing the electromagnetic emitter placement until the threshold value for signal strength defined by client requirements is satisfied.

2. The computer program product of claim 1, the computer code further comprising instructions that are operable when executed to assign roles to one or more users of a collaboration, the roles comprising one or more of a host of a collaborative design session, a designer, a client, or a utility.

3. The computer program product of claim 2, the computer code further comprising instructions that are operable when executed to provide a user with host privileges to the web-based collaborative session, the host privileges comprising creating and managing the web-based collaborative session.

4. The computer program product of claim 2, the computer code further comprising instructions that are operable when executed to provide a user with designer privileges, the designer privileges comprising creating structural elements for the structural layout, designing a structural layout using structural elements, placing electromagnetic emitters, and electromagnetic attenuation zones.

5. The computer program product of claim 4, wherein structural elements comprise a perimeter, walls, occupant zones, and selects the ceiling types.

6. The computer program product code of claim 4, wherein the designer privileges further comprises access to load a floorplan from a project repository.

7. The computer program product of claim 2, the computer code further comprising instructions that are operable when executed to provide a user with client privileges, the client privileges comprising write access to provide the floorplan to the workspace, and location data that corresponds to the floorplan.

8. A computer implemented method comprising:
initializing a collaborative web-based session for designing the structural layout;
transmitting invitations to a plurality of users of the collaborative web-based session;
providing a web-based interface for each user of the collaborative web-based session;
receiving one or more design parameters into a web server for designing a placement of one or more electromagnetic emitters from a first of the plurality of users of the collaborative web-based session;
receiving inputs for a design of a structural layout for configuring a wireless network;
receiving inputs from a second of the plurality of users of the web-based session for virtually placing a plurality of electromagnetic emitters in different areas around the structural layout;
testing electromagnetic signal strength in the structural layout using a virtualized simulation of electromagnetic emissions from each of the electromagnetic emitters; and
changing the electromagnetic emitter placement based on the testing of the electromagnetic signal strength;
wherein testing electromagnetic signal strength comprises:
identifying one or more space points in the structural layout and identifying signal loss; and
determine at each space point a signal strength, a signal radius, and a threshold value for signal strength defined by client requirements; and
wherein changing the electromagnetic emitter placement comprises iteratively changing the electromagnetic emitter placement until the threshold value for signal strength defined by client requirements is satisfied.

9. The method of claim 8, the computer code further comprising instructions that are operable when executed to assign roles to one or more users of a collaboration, the roles comprising one or more of a host of a collaborative design session, a designer, a client, or a utility.

10. The method of claim 9, the computer code further comprising instructions that are operable when executed to provide a user with host privileges to the web-based collaborative session, the host privileges comprising creating and managing the web-based collaborative session.

11. The method of claim 9, the computer code further comprising instructions that are operable when executed to provide a user with designer privileges, the designer privileges comprising creating structural elements for the structural layout, designing a structural layout using structural elements, placing electromagnetic emitters, and electromagnetic attenuation zones.

12. The method of claim 11, wherein structural elements comprise a perimeter, walls, occupant zones, and selects the ceiling types.

13. The method of claim 11, wherein the designer privileges further comprise access to load a floorplan from a project repository.

14. The method of claim 9, the computer code further comprising instructions that are operable when executed to provide a user with client privileges, the client privileges comprising write access to provide the floorplan to the workspace, and location data that corresponds to the floorplan.

* * * * *